UNITED STATES PATENT OFFICE.

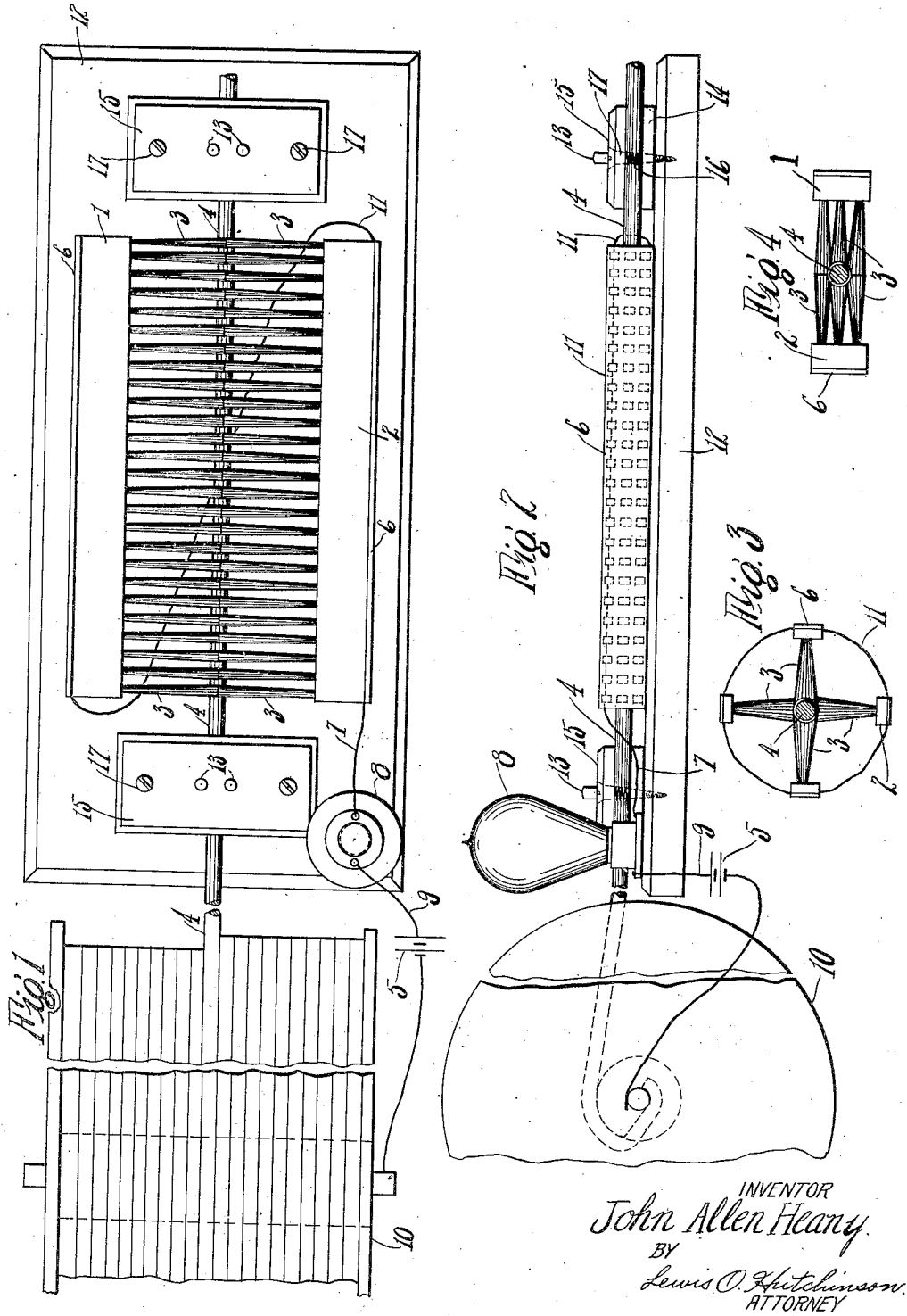

JOHN ALLEN HEANY, OF NEW HAVEN, CONNECTICUT, ASSIGNOR, BY MESNE ASSIGNMENTS, TO ROCKBESTOS PRODUCTS CORPORATION, A CORPORATION OF DELAWARE.

INSULATION-TESTING DEVICE.

1,407,693.

Specification of Letters Patent.   Patented Feb. 28, 1922.

Application filed December 6, 1918.  Serial No. 265,535.

*To all whom it may concern:*

Be it known that I, JOHN ALLEN HEANY, a citizen of the United States, residing at New Haven, in the county of New Haven and State of Connecticut, have invented certain new and useful Improvements in Insulation-Testing Devices, of which the following is a specification.

This invention relates to means for detecting imperfections in the insulation of electrical conductors.

In the manufacture of insulated wire for use in the electrical arts, it is the general practice to provide some form of apparatus accessory to the wire covering machinery for testing the continuity of the insulating sheath as fast as it is produced. Such testing apparatus usually takes the form of an electrical signaling circuit, including a contact member arranged to engage the surface of the freshly-applied insulating sheath and which is intended to complete a circuit through a portion of the conductor and the signal when a break in the insulation or a fragment of metal embedded in the insulation results in a circuit-closing connection between the contact member and the conductor. So far as I am aware, the particular form of contact member employed has invariably been of such a type as to preclude the closing of a circuit unless the break in the insulating sheath was of a substantial size. This defect has been chiefly due to the practice of constructing the contact members sufficiently large to withstand the wearing action of the continuous friction produced by the insulated conductor as it is drawn through the machine, with the result that the area of surface contact between the contact members and the insulating sheath has been so large that breaks in the insulation that were comparatively small would pass by the contact members without detection.

It is the object of the present invention to provide an insulation testing device of the general nature referred to, in which contact members are provided that will close a detecting circuit through minute, as well as comparatively large breaks in the insulation, and that will, at the same time, adequately withstand the wearing action of the moving conductor.

With this object in view, I have provided an insulation testing apparatus in which a contact device embodies as its principal element a brush-like member having tufts of contact wires, so disposed as to present their free ends substantially perpendicularly or at a tangent to the surface of the insulating sheath on the conductor. A plurality of brushes of the character described are so arranged with relation to each other that the individual wires project inwardly to a common center line along which the conductor is drawn transversely to and in contact with the free ends of the wires. I have found that, with a structure such as this, the brush wires will thoroughly search out and enter any breaks, however small, that may exist in the insulating sheath and make contact with the conductor, so that a substantially infallible indication is given of the condition of the insulation as the wire is drawn through the machine.

In the drawings, in which a preferred embodiment of the invention is illustrated,—

Fig. 1 is a plan view of a wire brush contacting device embodying the invention;

Fig. 2 is a side elevation of the device shown in Fig. 1;

Fig. 3 is an end view of a modified arrangement of contact wires; and

Fig. 4 is an end view of the arrangement of contact wires shown in Figs. 1 and 2.

In the drawing, 1 and 2 represent oppositely disposed sets of brushes having tufts of inwardly extending wires 3 whose free ends reach to a common center line substantially coincident with the path of travel of the moving conductor 4. The tufts of wires 3 extend substantially at right angles to the axis of the conductor and have both a radial and a tangential relation thereto, as indicated in Fig. 4, so that they present extremely small areas of contact to the engaged surfaces of the insulation in order to enter any breaks in the insulating sheath and make contact with the conducting core within.

In order to utilize the described disposition of the brush wires referred to, I place the brushes in connection with a source of current 5 through the conducting strips 6, with which the confined brush ends are in actual contact, the conductor 7, indicating lamp 8, and conductor 9. The other side of the battery 5 is preferably grounded on the supply reel 10, to which the end of the conductor 4 is electrically connected. The conducting strips 6 with which the brushes are in electrical contact are electrically connected to each other by means of the conductor 11 so that all the wires 3 of both brushes 1 and 2 are in electrical communication with the source of current 5, as will be obvious.

With the above arrangement a break in the insulating sheath of the conductor 4 will permit one or more of the wires 3 to make direct contact with the conductor 4 as the conductor is drawn through the device from the supply reel 10. This will result in the closing of a circuit through the lamp 8 and cause it to light up, thus warning the attendant of an imperfection in the insulation. This circuit permits current to flow from the source of current 5 to the grounded connection on the supply roll 10, thence through the conductor 4, one or more wires 3, contact strip or strips 6, conductor 7, lamp 8, and conductor 9, back to battery 5.

In order to guide or direct the conductor 4 in a constant path of travel above the base member 12, guiding pins 13 are arranged in pairs adjacent either end of the base member between which the conductor 4 is drawn. There is preferably also provided a guide member 14 at either end of the base across the top of which the conductor 4 is drawn. A third set of guide members 15 is arranged to engage the uppermost surface of the conductor and is prevented from bearing with excessive pressure on the conductor by the action of the compression springs 16 interposed between the upper and lower guide members. The maximum distance separating the upper and lower guide members can be varied by means of the screws 17 in an obvious manner.

By reference to Fig. 4 of the drawing, it will be seen that the horizontally extending brush wires 3 are preferably arranged in three vertical sets or tiers of tufts. The wires of the middle tier, which may be slightly shorter than the wires of the uppermost and lowermost tiers, are thus brought into a substantially radial engagement with the insulating sheath on the conductor, while the remaining wires will have a substantially tangential relation to the upper and the lower surfaces of the conductor. In Fig. 3 is shown an arrangement in which the wires are presented end-on or in a radial relation to four sides of the conductor. Obviously, this feature may be still further extended and the wires may be arranged to have a radial engagement to the insulated conductor from every possible angle. By providing a relatively large number of separate tufts or groups of contact wires, I make sure that all portions of the insulating sheath are engaged by the wire ends, so that the possibility of a break existing in the insulating sheath that would not be detected is rendered practically negligible.

While the insulation testing apparatus disclosed has been shown in connection with round wire conductors in all instances, it will be clear that it can be employed with conductors of other than circular cross-section. The extremely good contacting action afforded by the slender and flexible contact wires, particularly adapts the device for use in testing the insulation on conductors of the flat-wire type.

It will be seen that I have provided a contact device for insulation treating apparatus that will insure the detection of every break or fault in the insulation, however minute, and that will at the same time withstand the wearing action of the moving conductor.

What I claim is—

1. In an insulated-conductor testing-apparatus having an indicating circuit including a source of electricity and a signaling device, a contact device in the form of a plurality of tufts of wire having an oppositely-disposed relation to an interposed section of conductor with which the free ends of the tufts make contact.

2. An insulation testing device, comprising, a base member, conductor guiding members mounted on said base member, wire contact members mounted on said base member and arranged to engage the insulating covering of a conductor as it is drawn across said base member between said guiding members, a signaling device mounted on said base member, and a circuit including a source of current and said signaling device, said signaling device having one side connected to said conductor and the other side connected through said signaling device to said wire contact members, whereby a fault in the insulation will permit the wire contact members to make contact with said conductor and close a circuit through said signaling device.

3. An insulation testing device, comprising, a base member, conductor guiding members mounted on said base member, a brush back member having tufts of wire contact members mounted therein with their free ends projecting to the path of travel of said conductor to engage the insulated covering thereon as the conductor is drawn across said base member between said guiding members, a signaling device mounted on said base member, and a circuit including a source of current and said signaling device, said signaling device having one side connected to said conductor and the other side connected through said signaling device to said wire contact members, whereby a fault in the insulation will permit the wire contact members to make contact with said conductor and close a circuit through said signaling device.

4. An insulation testing device, comprising, a base member, conductor guiding members mounted on said base member, oppositely disposed wire brushes having their wires extending toward each other to an intermediate position coincident with the path of travel of the conductor, whereby the free ends of the wires will engage the insulating covering of the conductor as the conductor is drawn across said base member between said guiding members, a signaling device mounted on said base member, and a circuit including a source of current and said signaling device, said signaling device having one side connected to said conductor and the other side connected through said signaling device to said wire brushes, whereby a fault in the insulation will permit the wire contact members to make contact with said conductor and close a circuit through said signaling device.

5. A contact device for an insulation testing apparatus, comprising, tufts of contact wires mounted substantially transversely to the path of travel of a relatively advancing insulated conductor, with certain of the contact wires engaging the conductor in an endwise relation and others of the wire engaging the conductor in a sidewise relation.

6. An electrical contact device comprising: a pair of wire brush members mounted with the free ends of the wires of the two brushes extending into substantial contact with each other to engage a body placed at the ends of the oppositely-extending wires, said wires being arranged to be connected into a circuit.

JOHN ALLEN HEANY.